(12) United States Patent
Takahashi et al.

(10) Patent No.: US 9,806,764 B2
(45) Date of Patent: Oct. 31, 2017

(54) POWER TRANSMITTING APPARATUS, POWER RECEIVING APPARATUS, AND NON-CONTACT POWER TRANSMISSION SYSTEM

(71) Applicant: MURATA MANUFACTURING CO., LTD., Nagaokakyo, Kyoto-Fu (JP)

(72) Inventors: Hironobu Takahashi, Nagaokakyo (JP); Tsutomu Ieki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 617 days.

(21) Appl. No.: 14/464,334

(22) Filed: Aug. 20, 2014

(65) Prior Publication Data

US 2014/0354084 A1 Dec. 4, 2014

Related U.S. Application Data

(63) Continuation of application No. PCT/JP2012/080017, filed on Nov. 20, 2012.

(30) Foreign Application Priority Data

Mar. 23, 2012 (JP) ................. 2012-067380

(51) Int. Cl.
*H02J 5/00* (2016.01)
*H04B 5/00* (2006.01)
*H02J 17/00* (2006.01)

(52) U.S. Cl.
CPC .............. *H04B 5/0012* (2013.01); *H02J 5/00* (2013.01); *H02J 17/00* (2013.01); *H04B 5/0037* (2013.01)

(58) Field of Classification Search
CPC ....... H04B 5/0012; H04B 5/0037; H02J 5/00; H02J 17/00
(Continued)

(56) References Cited

U.S. PATENT DOCUMENTS 5,703,710 A * 12/1997 Brinkman ................. G02F 1/03
359/251
2009/0206675 A1 * 8/2009 Camurati ................. H02J 17/00
307/104

(Continued)

FOREIGN PATENT DOCUMENTS

JP   H09-46084 A    2/1997
JP   2003-69271 A   3/2003
(Continued)

OTHER PUBLICATIONS

International Search Report and Written Opinion of PCT/JP2012/080017, dated Jan. 8, 2013.

*Primary Examiner* — Jared Fureman
*Assistant Examiner* — Michael Warmflash
(74) *Attorney, Agent, or Firm* — Arent Fox LLP

(57) ABSTRACT

An active electrode and a passive electrode provided in a power transmitting apparatus 10 are connected to an inductor provided on the secondary side of a transformer generating an AC voltage and are respectively coupled to an active electrode and a passive electrode of a power receiving apparatus through electric fields. A ground electrode of the power transmitting apparatus faces the active electrode and the passive electrode and a ground electrode of the power receiving apparatus faces the active electrode and the passive electrode. A plurality of openings are formed in such a manner as to form a lattice in each of the ground electrodes.

20 Claims, 9 Drawing Sheets

(58) Field of Classification Search
USPC .......................................................... 307/149
See application file for complete search history.

(56) References Cited

U.S. PATENT DOCUMENTS

| 2012/0049640 A1* | 3/2012 | Ichikawa | ................ | H02J 5/005 |
| | | | | 307/99 |
| 2012/0299392 A1* | 11/2012 | Ichikawa | ................ | H02J 5/005 |
| | | | | 307/109 |

FOREIGN PATENT DOCUMENTS

| JP | 2008-258464 A | 10/2008 |
| JP | 2009-89520 A | 4/2009 |
| JP | 2010-213554 A | 9/2010 |
| JP | 2012-50314 | 3/2012 |
| WO | WO-2011/148803 A1 | 12/2011 |

\* cited by examiner

US 9,806,764 B2

POWER TRANSMITTING APPARATUS, POWER RECEIVING APPARATUS, AND NON-CONTACT POWER TRANSMISSION SYSTEM

CROSS REFERENCE TO RELATED APPLICATIONS

The present application is a continuation of PCT/JP2012/080017 filed Nov. 20, 2012, which claims priority to Japanese Patent Application No. 2012-067380, filed Mar. 23, 2012, the entire contents of each of which are incorporated herein by reference.

FIELD OF THE INVENTION

The present invention relates to a power transmitting apparatus, and specifically to a power transmitting apparatus configured to transmit power to a power receiving apparatus coupled to the power transmitting apparatus through an electric field.

The present invention also relates a power receiving apparatus, and specifically to a power receiving apparatus configured to receive power from a power transmitting apparatus coupled to the power transmitting apparatus through an electric field.

The present invention also relates to a non-contact power transmission system formed of the above-described power transmitting apparatus and power receiving apparatus.

BACKGROUND OF THE INVENTION

An example of an apparatus of this kind is disclosed in Patent Document 1. According to this background technology, a fixed body including a plurality of power transmitting electrodes is arranged in a power supplying area and a movable body including a plurality of power receiving electrodes is arranged in a power supplied area. The plurality of power transmitting electrodes are arranged in the vicinity of an interface between the power supplying area and power supplied area. Further, the plurality of power receiving electrodes are arranged in the vicinity of the interface in such a manner as to face the plurality of power transmitting electrodes in a non-contact manner.

Here, the fixed body is housed between a floor plate and a metal plate, and the power transmitting electrodes provided in the fixed body are unified with the metal plate. A radio wave absorber is also housed between the floor plate and the metal plate. High-frequency noise generated from the fixed body is absorbed by the radio wave absorber, whereby the communication quality is maintained.

Further, in the movable body, a radio wave absorber is provided in the vicinity of the power receiving electrodes, and the power receiving electrodes and the radio wave absorber are covered with a metal plate. A portion of high-frequency noise generated from the movable body is absorbed by the radio wave absorber, and leakage of the rest of the high-frequency noise is prevented by the metal plate.

Patent Document 1: Japanese Unexamined Patent Application Publication No. 2009-89520

However, the background technique has a problem in that when the apparatus is reduced in size, parasitic capacitances are generated between the metal plate and the power transmitting electrodes or power receiving electrodes, whereby the power transmission efficiency or the power reception efficiency is decreased.

SUMMARY OF THE INVENTION

Hence, the main object of the present invention relates to a power transmitting apparatus that can suppress a decrease in power transmission efficiency.

Another object of the present invention is to provide a power receiving apparatus that can suppress a decrease in power reception efficiency.

Still another object of the present invention is to provide a non-contact power transmission system that can suppress a decrease in power transfer efficiency.

A power transmitting apparatus according to the present invention includes: a first power transmitting electrode that is connected to one end of an AC power supply circuit and that is coupled through an electric field to a first power receiving electrode of a power receiving apparatus; a second power transmitting electrode that is connected to another end of the AC power supply circuit and that is coupled through an electric field to a second power receiving electrode of the power receiving apparatus; and a ground electrode that faces the first power transmitting electrode and the second power transmitting electrode. For at least one of a first facing region in which the first power transmitting electrode and the ground electrode face each other and a second facing region in which the second power transmitting electrode and the ground electrode face each other, an area of the ground electrode is made to be smaller than an area of the power transmitting electrode facing the ground electrode.

Preferably, the area of the ground electrode is reduced by forming an opening and/or a cutout.

Preferably, a maximum size of an inner length of the opening is less than or equal to 1/N of a wave length of a sine wave defining an AC voltage, N being an even number larger than or equal to two.

A power receiving apparatus according to the present invention includes: a first power receiving electrode that is connected to one end of a load circuit and that is coupled through an electric field to a first power transmitting electrode of a power transmitting apparatus; a second power receiving electrode that is connected to another end of the load circuit and that is coupled through an electric field to a second power transmitting electrode of the power transmitting apparatus; and a ground electrode that faces the first power receiving electrode and the second power receiving electrode. For at least one of a first facing region in which the first power receiving electrode and the ground electrode face each other and a second facing region in which the second power receiving electrode and the ground electrode face each other, an area of the ground electrode is made to be smaller than an area of the power receiving electrode facing the ground electrode.

A non-contact power transmission system according to the present invention includes: a power transmitting apparatus including a first power transmitting electrode that is connected to one end of an AC power supply circuit, and a second power transmitting electrode that is connected to another end of the AC power supply circuit, and a ground electrode that faces the first power transmitting electrode and the second power transmitting electrode; and a power receiving apparatus including a first power receiving electrode that is connected to one end of a load circuit and that is coupled through an electric field to the first power transmitting electrode, a second power receiving electrode that is connected to another end of the load circuit and that is coupled through an electric field to the second power transmitting electrode. For at least one of a first facing region in which the first power transmitting electrode and the ground electrode face each other and a second facing region in which the second power transmitting electrode and the ground electrode face each other, an area of the ground electrode is made to be smaller than an area of the power transmitting electrode facing the ground electrode.

A non-contact power transmission system according to the present invention includes: a power transmitting apparatus including a first power transmitting electrode that is connected to one end of an AC power supply circuit, and a second power transmitting electrode that is connected to another end of the AC power supply circuit; and a power receiving apparatus including a first power receiving electrode that is connected to one end of a load circuit and that is coupled through an electric field to the first power transmitting electrode, a second power receiving electrode that is connected to another end of the load circuit and that is coupled through an electric field to the second power transmitting electrode, and a ground electrode facing the first power receiving electrode and the second power receiving electrode. For at least one of a first facing region in which the first power receiving electrode and the ground electrode face each other and a second facing region in which the second power receiving electrode and the ground electrode face each other, an area of the ground electrode is made to be smaller than an area of the power receiving electrode facing the ground electrode.

According to the present invention, a shielding effect is realized by forming a ground electrode. Further, a decrease in power transmission efficiency, power reception efficiency, or power transfer efficiency is suppressed by making the area of the ground electrode smaller than the area of an electrode facing the ground electrode for at least one of the first facing region and the second facing region.

The objects described above, other objects, features, and advantages of the present invention will become more apparent from the following detailed description of embodiments with reference to the attached drawings.

DETAILED DESCRIPTION OF THE PREFERRED EMBODIMENTS

Figure 1:
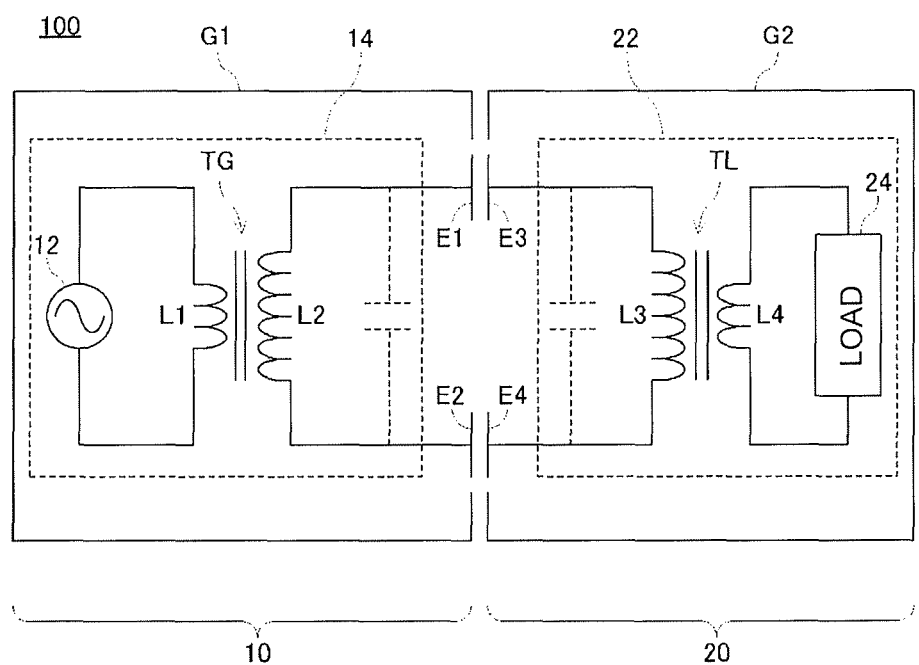
FIG. 1 is a block diagram of a configuration of an embodiment of the present invention.
Figure 2:
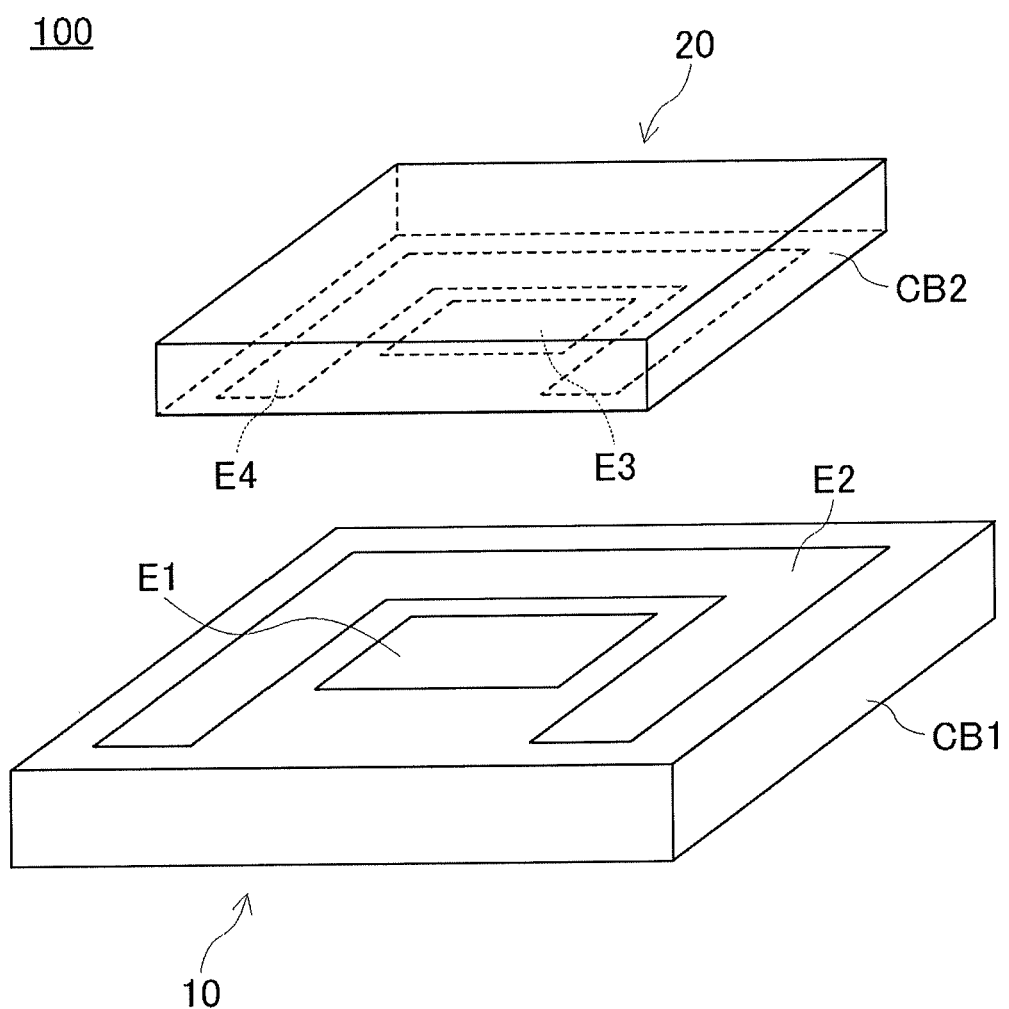
FIG. 2 is a diagram illustrating an example of an external view of the embodiment illustrated in FIG. 1.

Referring to FIG. 1 and FIG. 2, a non-contact power transmission system 100 according to the present embodiment is formed of a power transmitting apparatus 10 and a power receiving apparatus 20. A power transmitting side active electrode E1 and a power transmitting side passive electrode E2 are provided on one main surface side of a casing CB1 forming part of the power transmitting apparatus 10. A power receiving side active electrode E3 and a power receiving side passive electrode E4 are provided on one main surface side of a casing CB2 forming part of the power receiving apparatus 20. When the one main surface of the casing CB2 is placed near the one main surface of the casing CB1 (refer to FIG. 2), the power receiving side active electrode E3 and the power receiving side passive electrode E4 are respectively coupled to the power transmitting side active electrode E1 and the power transmitting side passive electrode E2 through electric fields. As a result, power is transmitted from the power transmitting apparatus 10 to the power receiving apparatus 20.

Note that although omitted in FIG. 2, a power transmitting side ground electrode G1 is provided on the other main surface side of the casing CB1 and a power receiving side ground electrode G2 is provided on the other main surface side of the casing CB2.

Referring to FIG. 1, one end and the other end of an AC power supply 12 are respectively connected to one end and the other end of an inductor L1 provided on the primary side of a transformer TG. One end and the other end of an inductor L2 provided on the secondary side of the transformer TG are respectively connected to the power transmitting side active electrode E1 and the power transmitting side passive electrode E2.

Hence, when an AC voltage is output from the AC power supply 12, an AC voltage is induced between the power transmitting side active electrode E1 and the power transmitting side passive electrode E2. Here, the number of turns of the inductor L2 is larger than the number of turns of the inductor L1 and, hence, the AC voltage applied between the power transmitting side active electrode E1 and the power transmitting side passive electrode E2 is larger than the AC voltage output from the AC power supply 12. Note that the AC power supply 12 and the transformer TG form an AC power supply circuit 14. The AC power supply circuit 14 is connected between the power transmitting side active electrode E1 and the power transmitting side passive electrode E2. A capacitance C1 illustrated using a dotted line between the power transmitting side active electrode E1 and the power transmitting side passive electrode E2 represents a parasitic capacitance generated between the power transmitting side active electrode E1 and the power transmitting side passive electrode E2.

An AC voltage having a frequency corresponding to a frequency of the AC voltage applied between the power transmitting side active electrode E1 and the power transmitting side passive electrode E2 and having a magnitude depending on the degree of electric field coupling is generated between the power receiving side active electrode E3 and the power receiving side passive electrode E4.

The generated AC voltage is supplied to a load 24 via inductors L3 and L4 respectively provided on the primary side and the secondary side of a transformer TL. Here, the number of turns of the inductor L4 is smaller than the number turns of the inductor L3 and, hence, an AC voltage applied to the load 24 is smaller than the AC voltage generated between the power receiving side active electrode E3 and the power receiving side passive electrode E4. Note that the transformer TL and the load 24 form a load circuit 22. The load circuit 22 is connected between the power receiving side active electrode E3 and the power receiving side passive electrode E4. A capacitance C2 illustrated using a dotted line between the power receiving side active electrode E3 and the power receiving side passive electrode E4 represents a parasitic capacitance generated between the power receiving side active electrode E3 and the power receiving side passive electrode E4.

Note that a configuration may be employed in which without providing the transformer TG and the transformer TL, the AC power supply 12 is connected between the power transmitting side active electrode E1 and the power transmitting side passive electrode E2, and the load 24 is connected between the power receiving side active electrode E3 and the power receiving side passive electrode E4. Further, for example, the frequency of the AC voltage is set to a high frequency ranging from ten kilohertz to several tens of megahertz, although it is not limited to this range. Further, for example, the high voltage is set to a voltage ranging from 100 V to 10 kV, although it is not limited to this range.

Figure 3:
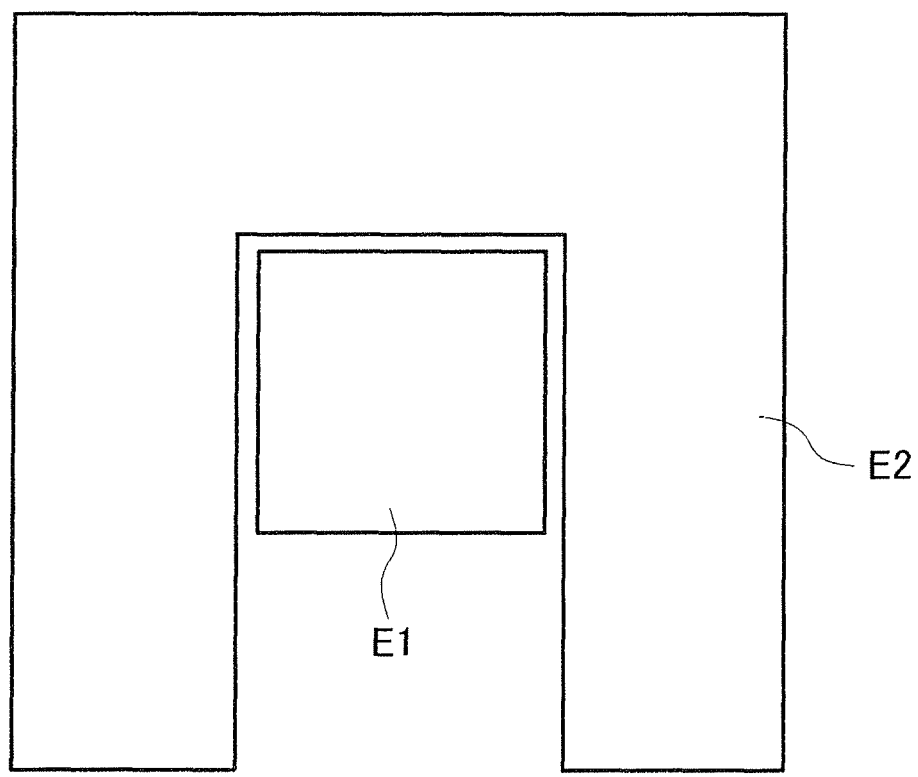
FIG. 3 is a diagram illustrating an example of a top view of a power transmitting side active electrode and a power transmitting side passive electrode.

Referring to FIG. 3, the power transmitting side active electrode E1 is formed in such a manner as to have a main surface shaped like a square, and the power transmitting side passive electrode E2 is formed in such a manner as to have a substantially U-shaped main surface.

A rectangle that circumscribes the outline of the main surface of the power transmitting side passive electrode E2 is a square that is larger than the square shape of the main surface of the power transmitting side active electrode E1. The power transmitting side passive electrode E2 is produced by preparing an electrode that has a main surface corresponding to the circumscribing rectangle described above, by forming a square opening at the center of the main surface of this electrode, and by forming a cutout which has a width corresponding to a side of the opening and which extends from the opening to the external edge of the electrode. Here, the size of the opening is slightly larger than that of the square shape of the main surface of the power transmitting side active electrode E1. Two opposing sides of the square shape of the opening extend parallel with two opposing sides of the square shape of the circumscribing rectangle.

Figure 4:
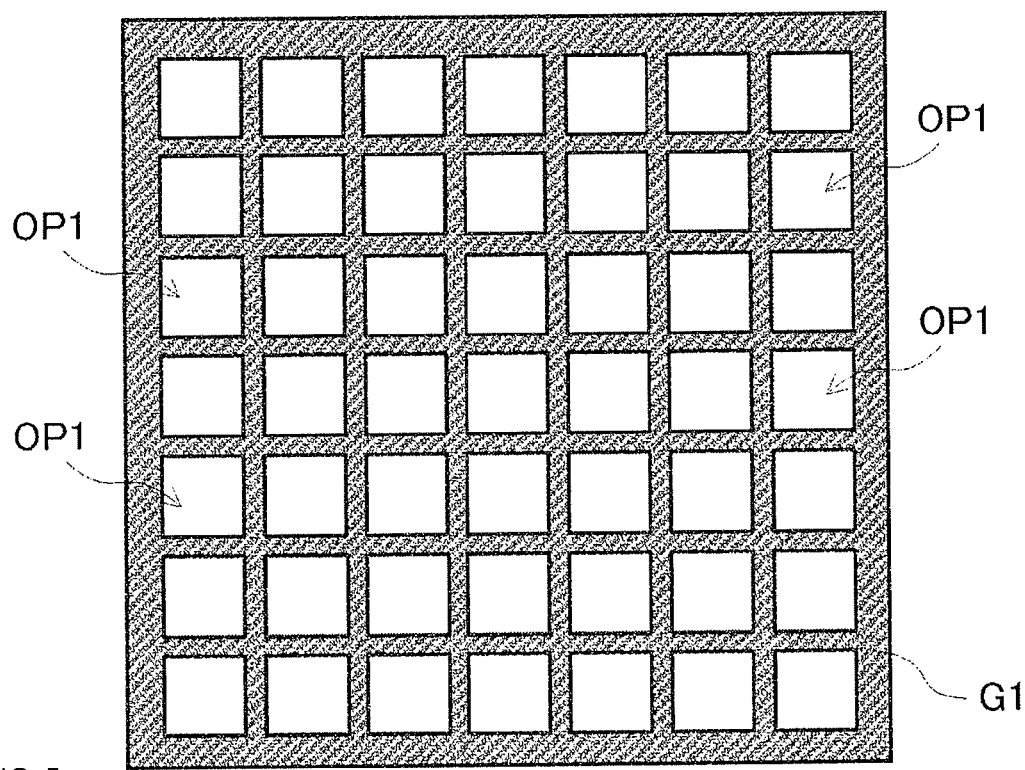
FIG. 4 is a diagram illustrating an example of a top view of a power transmitting side ground electrode.

Referring to FIG. 4, the power transmitting side ground electrode G1 is formed in such a manner that the main surface thereof is shaped like a square. The square shape of the main surface of the power transmitting side ground electrode G1 coincides with the rectangle circumscribing the outline of the main surface of the power transmitting side passive electrode E2. In the main surface of the power transmitting side ground electrode G1, a plurality of openings OP1, OP1, . . . , and OP1, each shaped like a square, are formed in such a manner as to form a lattice. In more detail, seven of the openings OP1, OP1, . . . , and OP1 are arranged in each of the lateral and vertical directions, thereby forming a total of 49 openings OP1, OP1, . . . , and OP1.

The maximum inner length of each of the openings OP1 is made to be less than or equal to half the wavelength of an AC voltage signal. This can suppress a phenomenon in which the AC voltage signal is radiated to the outside of the power transmitting apparatus 10. In other words, a shielding effect is realized. Note that in order to suppress the nth harmonic component (n: an integer greater than or equal to two) of the AC voltage signal, the maximum inner length of each of the openings OP1 needs to be adjusted to be less than or equal to $1/(n*2)$ of the wavelength of the AC voltage signal.

Figure 5:
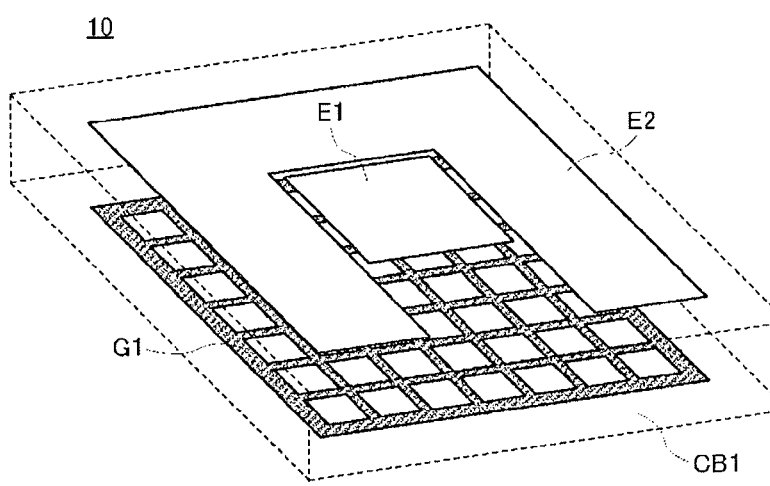
FIG. 5 is a perspective view of an example of a state in which the power transmitting side active electrode, the power transmitting side passive electrode, and the power transmitting side ground electrode are arranged in a casing.

As can be seen from FIG. 5, the power transmitting side active electrode E1 is arranged at the center on one main surface side of the casing CB1, and the power transmitting side passive electrode E2 is arranged on the one main surface side of the casing CB1 in such a manner as to surround the power transmitting side active electrode E1. The power transmitting side ground electrode G1 is arranged at the center on the other main surface side of the casing CB1. Here, both the power transmitting side active electrode E1 and the power transmitting side passive electrode E2 are arranged in the casing CB1 in such a manner that the main surfaces thereof are positioned parallel with the one main surface of the casing CB1. Likewise, the power transmitting side ground electrode G1 is provided in the casing CB1 in such a manner that the main surface thereof is positioned parallel with the other main surface of the casing CB1.

Figure 6:
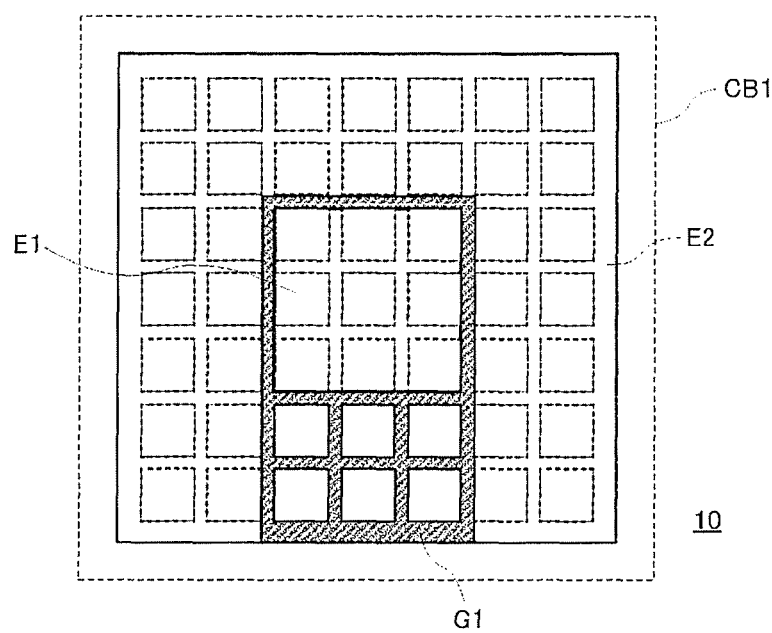
FIG. 6 is a diagram illustrating an example of a top view of the power transmitting side active electrode, the power transmitting side passive electrode, and the power transmitting side ground electrode arranged in the casing.

As a result, referring to FIG. 6, the power transmitting side active electrode E1 faces nine (=three lateral×three longitudinal) of the openings OP1, OP1, . . . and OP1 formed at the center of the power transmitting side ground electrode G1. Further, the power transmitting side passive electrode E2 faces 34 of the openings OP1, OP1, and OP1 among 40 of the openings OP1, OP1, . . . , and OP1 arranged at the periphery, excluding six of the openings facing the cutout.

Figure 7:
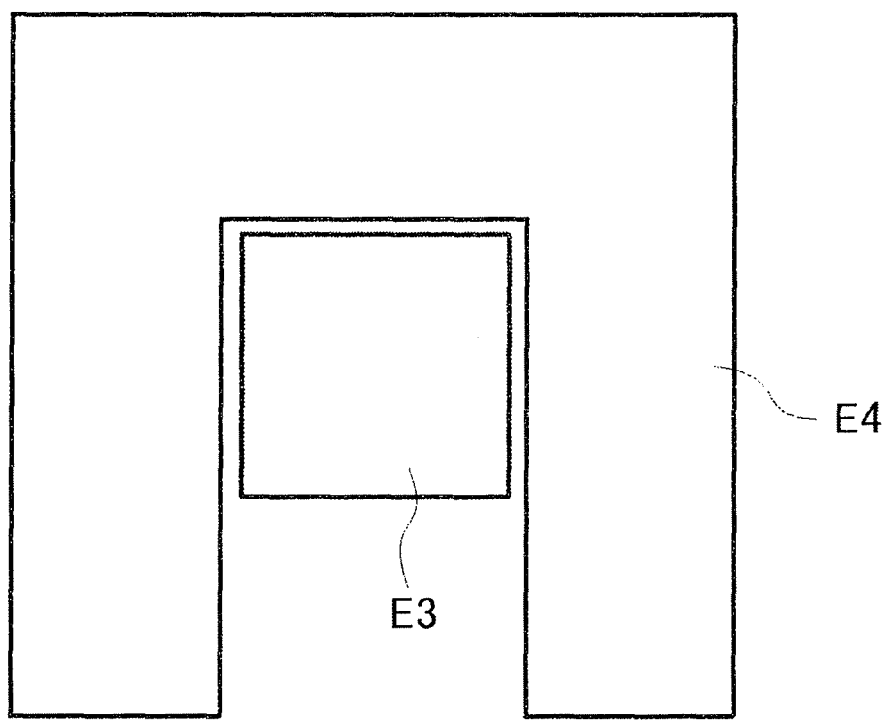
FIG. 7 is a diagram illustrating an example of a top view of a power receiving side active electrode and a power receiving side passive electrode.
Figure 8:
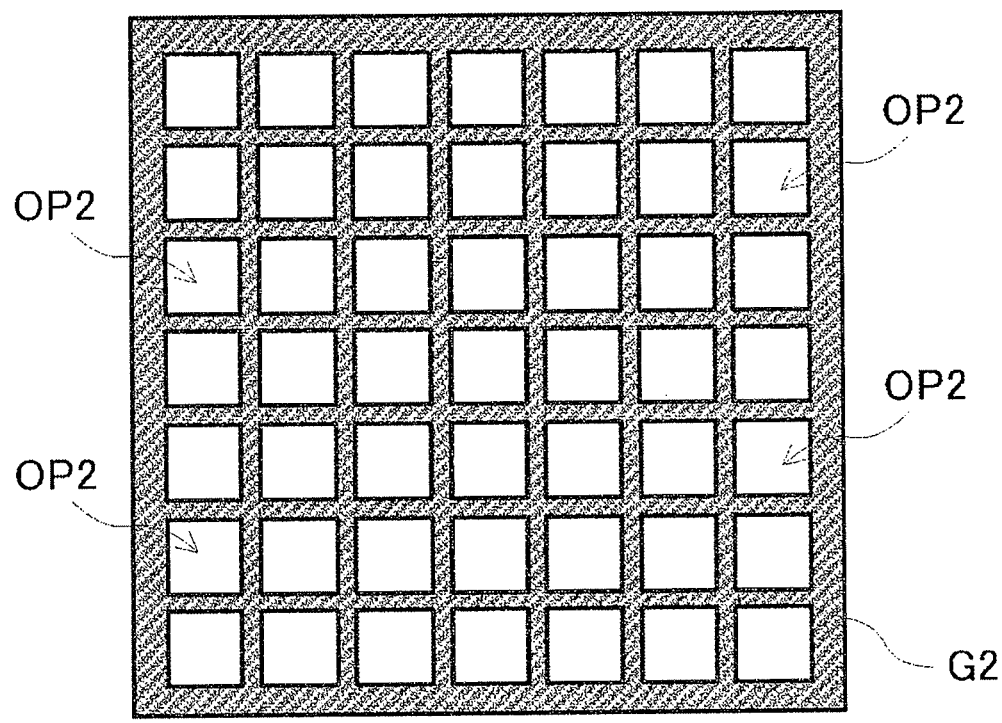
FIG. 8 is a diagram illustrating an example of a top view of a power receiving side ground electrode.

Referring to FIG. 7, the power receiving side active electrode E3 is also formed in such a manner as to have a main surface shaped like a square, and the power receiving side passive electrode E4 is also formed in such a manner as to have a substantially U-shaped main surface. The power receiving side passive electrode E4 is produced in a manner which is the same as the manner in which the power transmitting side passive electrode E2 is produced. Referring to FIG. 8, the power receiving side ground electrode G2 is also formed in such a manner that the main surface thereof is shaped like a square. The square shape of the main surface of the power receiving side ground electrode G2 coincides with the rectangle circumscribing the outline of the main surface of the power receiving side passive electrode E4. In the main surface of the power receiving side ground electrode G2, 49 openings OP2, OP2, . . . , and OP2 (=seven lateral×seven longitudinal), each shaped like a square, are formed in such a manner as to form a lattice.

Also in the power receiving side ground electrode G2, the maximum inner length of each of the openings OP2 is made to be less than or equal to ½ (more preferably, less than or equal to $1/(n*2)$) of the wavelength of the AC voltage signal. This can suppress a phenomenon in which the AC voltage signal is radiated to the outside of the power receiving apparatus 20. In other words, a shielding effect is realized.

Figure 9:
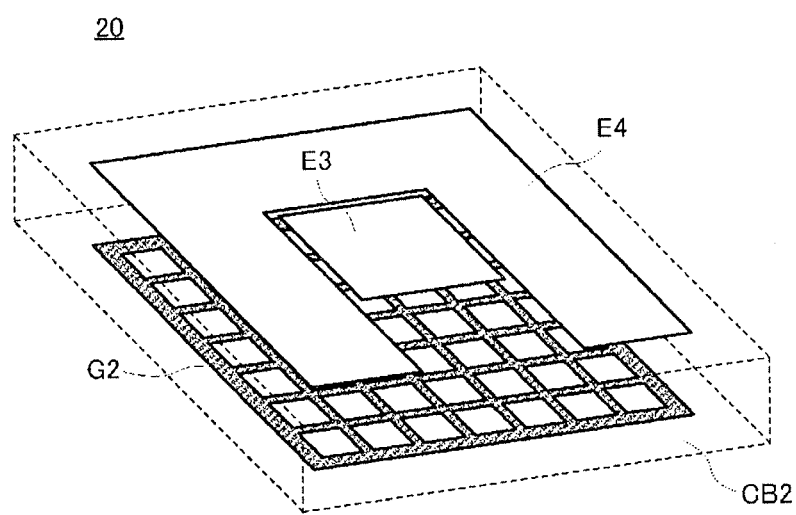
FIG. 9 is a perspective view of an example of a state in which the power receiving side active electrode, the power receiving side passive electrode, and the power receiving side ground electrode are arranged in a casing.
Figure 10:
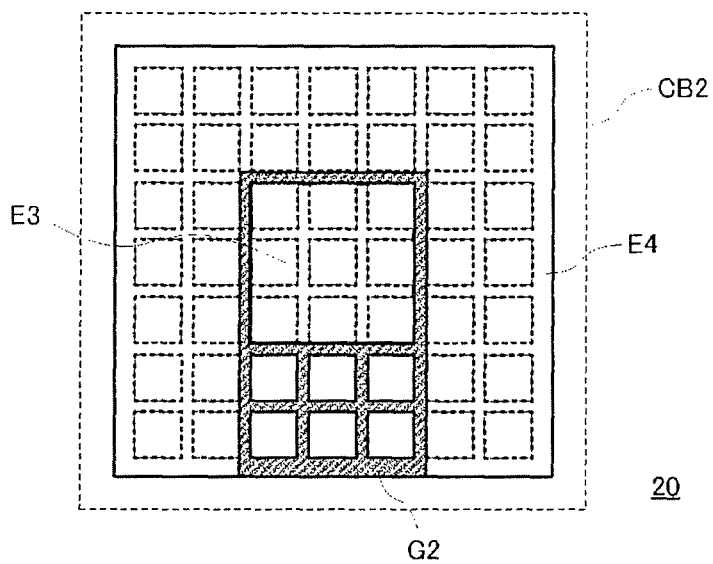
FIG. 10 is a diagram illustrating an example of a top view of the power receiving side active electrode, the power receiving side passive electrode, and the power receiving side ground electrode arranged in the casing.

As can be seen from FIG. 9, the power receiving side active electrode E3 is arranged at the center on one main surface side of the casing CB2, and the power receiving side passive electrode E4 is arranged on the one main surface side of the casing CB2 in such a manner as to surround the power receiving side active electrode E3. Further, the power receiving side ground electrode G2 is arranged at the center on the other main surface side of the casing CB2. As a result, referring to FIG. 10, the power receiving side active electrode E3 faces nine (=three lateral×three longitudinal) of the openings OP2, OP2, . . . , and OP2 formed at the center of the power receiving side ground electrode G2. Further, the power receiving side passive electrode E4 faces 34 of the openings OP2, OP2, . . . , and OP2 among 40 of the openings OP2, OP2, . . . , and OP2 arranged at the periphery, excluding six of the openings facing the cutout.

Parasitic capacitances generated between the power transmitting side ground electrode G1 and each of the power transmitting side active electrode E1 and the power transmitting side passive electrode E2 are connected in series and form parts of the capacitance C1 illustrated in FIG. 1. When the capacitance C1 increases, part of energy transmitted from the power transmitting apparatus 10 to the power receiving apparatus 20 is lost, whereby the efficiency of power transmission from the power transmitting apparatus to the power receiving apparatus is decreased.

Parasitic capacitances generated between the power receiving side ground electrode G2 and each of the power receiving side active electrode E3 and the power receiving side passive electrode E4 are connected in series and form parts of the capacitance C2 illustrated in FIG. 1. When the capacitance C2 increases, part of energy received by the power receiving apparatus 20 is lost, whereby power input to the load circuit 22 is decreased.

Note that, in the above discussion, it has been stated that parasitic capacitances generated between the ground electrode G1 and the power transmitting electrodes and parasitic capacitances generated between the ground electrode G2 and the power receiving electrodes form parts of the capacitance C1 and the capacitance C2. This corresponds to a case in which the ground electrodes of the power transmitting apparatus and power receiving apparatus are relatively small and are not connected to the external ground. In the case in which the ground electrodes of the power transmitting apparatus and power receiving apparatus are connected to the external ground, parasitic capacitances generated between the ground electrode G1 and the power transmitting electrodes and parasitic capacitances generated between the ground electrode G2 and the power receiving electrodes do not form parts of the capacitance C1 and the capacitance C2. However, since part of power to be coupled between the transmitter and receiver leaks to the ground potential, whereby power input to the load circuit 22 is decreased similarly to the case in which the ground electrodes is not connected to the external ground.

Parasitic capacitances generated between the power transmitting side ground electrode G1 and each of the power transmitting side active electrode E1 and the power transmitting side passive electrode E2 can be decreased by forming the plurality of openings OP1, OP1, . . . , and OP1 in the main surface of the power transmitting side ground electrode G1 (by making the area of the power transmitting side ground electrode G1 smaller than the area of the opposing electrodes). Similarly, parasitic capacitances generated between the power receiving side ground electrode G2 and each of the power receiving side active electrode E3 and the power receiving side passive electrode E4 can be decreased by forming the plurality of openings OP2, OP2, . . . and OP2 in the main surface of the power receiving side ground electrode G2 (by making the area of the power receiving side ground electrode G2 smaller than the area of the opposing electrodes). This suppresses a decrease in the degree of electric field coupling between the power transmitting apparatus 10 and the power receiving apparatus 20 and, hence, suppresses a decrease in the efficiency of power transmission from the AC power supply 12 to the load 24.

Note that the shape of the plurality of openings OP1, OP1, . . . , and OP1 formed in the power transmitting side ground electrode G1 or the shape of the plurality of openings OP2, OP2, . . . , and OP2 formed in the power receiving side ground electrode G2 may be a circle or any other shape and there may be variation in the sizes of the openings. When the sizes of the openings are to be varied, increasing the number of openings facing the power transmitting side active electrode E1 or the power receiving side active electrode E3 while decreasing the number of openings facing the power transmitting side passive electrode E2 or the power receiving side passive electrode E4 may be considered. Further, a plurality of cutouts may be formed at the end portion of the power transmitting side ground electrode G1 or the power receiving side ground electrode G2 in addition to the openings OP1 or the openings OP2.

In the present embodiment, 49 of the openings OP1, OP1, . . . , and OP1 are formed in the main surface of the power transmitting side ground electrode G1 in such a manner as to form a lattice (refer to FIGS. 4), and 49 of the openings OP2, OP2, . . . , and OP2 are formed in the main surface of the power receiving side ground electrode G2 in such a manner as to form a lattice (refer to FIG. 8).

Figure 11:
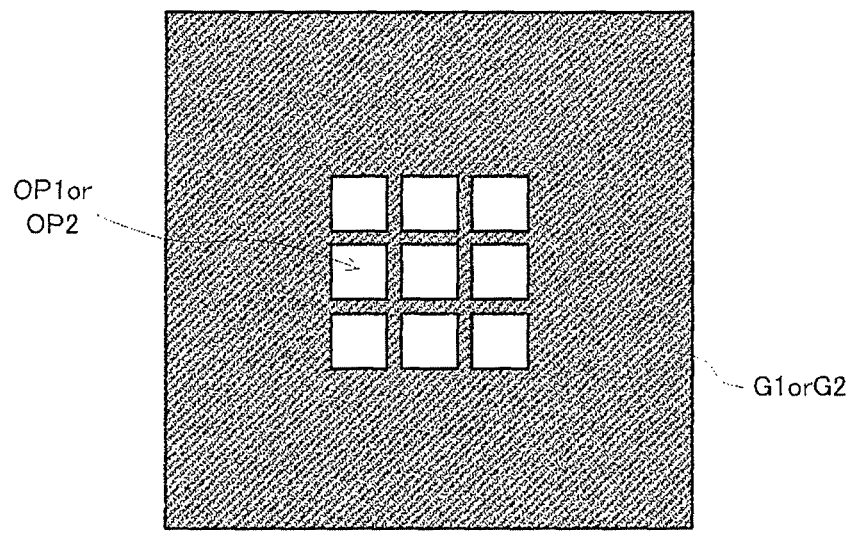
FIG. 11 is a diagram illustrating an example of a top view of a power transmitting side ground electrode or a power receiving side ground electrode applied to another embodiment.

However, as illustrated in FIG. 11, a configuration may be employed in which only nine of the openings OP1, OP1, . . . , and OP1 in a region facing the power transmitting side active electrode E1 are formed in the power transmitting side ground electrode G1, or only nine of the openings OP2 in a region facing the power receiving side active electrode E3 are formed in the power receiving side ground electrode G2. With this configuration, stray capacitance between the power transmitting side active electrode E1 and the corresponding ground electrode or between the power receiving side active electrode E3 and the corresponding ground electrode can be considerably decreased. Since the amplitude of an AC voltage applied to an active electrode is larger than that applied to a passive electrode, a greater effect is obtained by reducing coupling between the active electrode and a ground electrode to reduce power loss due to coupling between the active electrode and the ground electrode.

Figure 12:
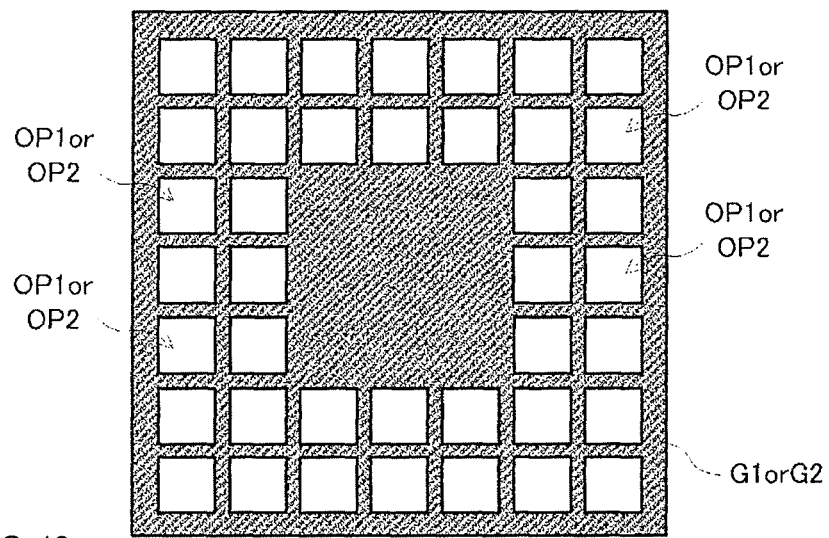
FIG. 12 is a diagram illustrating an example of a top view of a power transmitting side ground electrode or a power receiving side ground electrode applied to still another embodiment.

Note that, on the contrary to the above description, as illustrated in FIG. 12, a configuration may be employed in which only 40 of the openings OP1, OP1, . . . and OP1 in a region facing the power transmitting side passive electrode E2 are formed in the power transmitting side ground electrode G1 or only 40 of the openings OP2, OP2, . . . , and OP2 in a region facing the power receiving side passive electrode E4 are formed in the power receiving side ground electrode G2. The loss of power transmitted from the AC power supply 12 to the load 24 can be reduced also by reducing coupling between the passive electrode and the ground electrode.

Figure 13:
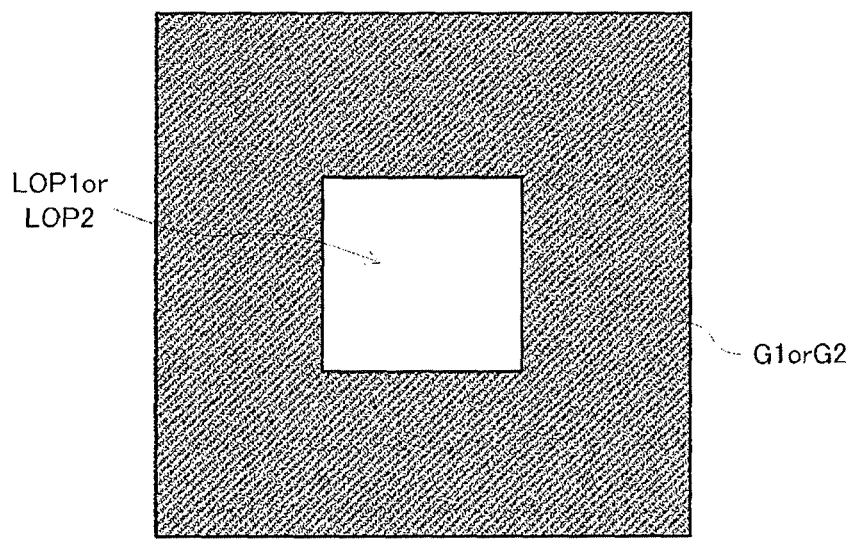
FIG. 13 is a diagram illustrating an example of a top view of a power transmitting side ground electrode or a power receiving side ground electrode applied to still another embodiment.
Figure 14:
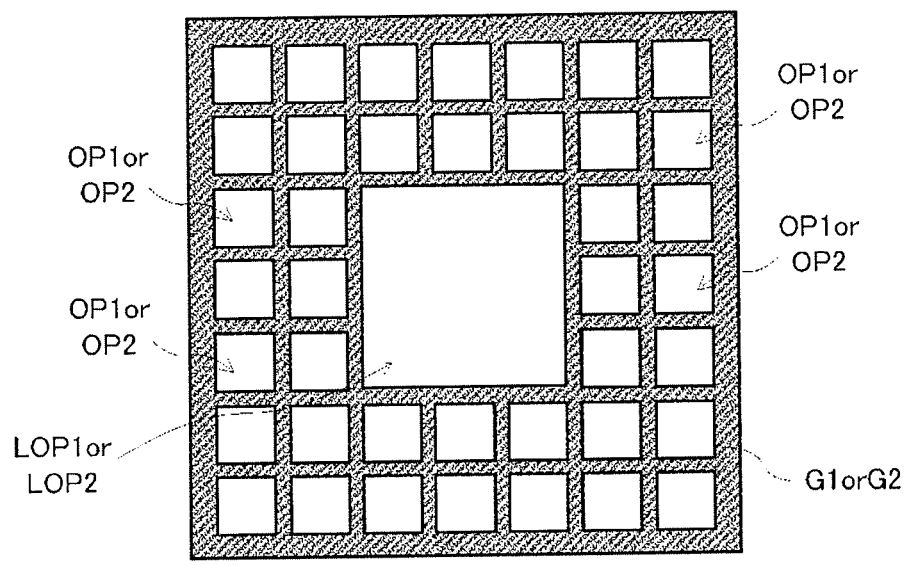
FIG. 14 is a diagram illustrating an example of a top view of a power transmitting side ground electrode or a power receiving side ground electrode applied to another embodiment.

Referring to FIG. 13, a configuration may be employed in which only an opening LOP1 as large as the main surface of the power transmitting side active electrode E1 is formed at the center of the main surface of the power transmitting side ground electrode G1, or an opening LOP2 as large as the main surface of the power receiving side active electrode E3 is formed at the center of the power receiving side ground electrode G2. Further, as illustrated in FIG. 14, a configuration may be employed in which 40 of the openings OP1, OP1, . . . , and OP1 are formed at the periphery surrounding the opening LOP1 in such a manner as to form a lattice, or 40 of the openings OP2, OP2, . . . , and OP2 are formed at the periphery surrounding the opening LOP2.

Further, in the embodiments described above, the single power transmitting side ground electrode G1 is provided in the transmitting apparatus 10 and the single power receiving side ground electrode G2 is provided in the power receiving apparatus 20. However, a configuration may be employed in which the power transmitting side ground electrode G1 is divided into one ground electrode facing the power transmitting side active electrode E1 and the other ground electrode facing the power transmitting side passive electrode E2, or the power receiving side ground electrode G2 is divided into one ground electrode facing the power receiving side active electrode E3 and the other ground electrode facing the power receiving side passive electrode E4.

Note that it is assumed that the power receiving apparatus is provided mainly in a mobile communication terminal or the like having a wireless communication function. In that case, the ground electrode needs to have also a function of shielding a wireless communication circuit for higher frequencies and, hence, it is necessary to make the size of the mesh openings smaller than in the case only for power transmission. In such a case, the invention of the present application can mainly be more effectively applied to a power transmitting apparatus allowing optimization of the mesh size for power transmission. By providing optimal-sized shield openings, power transmission efficiency can be improved and also the weight of a shield plate can be reduced, resulting in a reduction in the weight of an apparatus.

REFERENCE SIGNS LIST 10 power transmitting apparatus
20 power receiving apparatus
TG, TL transformers
12 AC power supply
14 AC power supply circuit
22 load circuit
24 load
100 non-contact power transmission system
E1 power transmitting side active electrode
E2 power transmitting side passive electrode
E3 power receiving side active electrode
E4 power receiving side passive electrode
G1 power transmitting side ground electrode
G2 power receiving side ground electrode

The invention claimed is:

1. A power transmitting apparatus for transmitting power to a power receiving apparatus coupled thereto through an electric field, the power transmitting apparatus comprising:
    a ground electrode;
    an AC power supply circuit;
    a first power transmitting electrode coupled to a first end of the AC power supply circuit and having a first surface that faces the ground electrode and overlaps a first region of the ground electrode; and
    a second power transmitting electrode coupled to a second end of the AC power supply circuit and having a second surface that faces the ground electrode and overlaps a second region of the ground electrode,
    wherein at least one of the first surface and the second surface has a surface area greater than a corresponding surface area of the first region and the second region of the ground electrode, respectively.

2. The power transmitting apparatus according to claim 1, wherein, when the power receiving apparatus is positioned adjacent the power transmitting apparatus, the first power transmitting electrode is coupled through the electric field to a first power receiving electrode of the power receiving apparatus and the second power transmitting electrode is coupled through the electric field to a second power receiving electrode of the power receiving apparatus.

3. The power transmitting apparatus according to claim 1, wherein the first power transmitting electrode is an active electrode and the second power transmitting electrode is a passive electrode.

4. The power transmitting apparatus according to claim 1, wherein the ground electrode comprises at least one opening such that the corresponding surface area of the first region or the second region is less than the surface area of the first surface or second surface, respectively.

5. The power transmitting apparatus according to claim 4, wherein a maximum size of an inner length of the at least one opening is less than or equal to 1/N of a wave length of a sine wave defining an AC voltage supplied by the AC power supply circuit, wherein N is an even number greater than or equal to two.

6. The power transmitting apparatus according to claim 1, wherein the first surface of the first power transmitting electrode comprises a square-shaped surface and the second surface of the second power transmitting electrode comprises a U-shaped surface.

7. The power transmitting apparatus according to claim 1, wherein the first power transmitting electrode and the second power transmitting electrode are disposed in a same plane of the power transmitting apparatus, and wherein the first surface and the second surface face the same direction.

8. A power receiving apparatus for receiving power from a power transmitting apparatus coupled thereto through an electric field, the power receiving apparatus comprising:
    a ground electrode;
    a first power receiving electrode coupled to a first end of a load circuit and having a first surface that faces the ground electrode and overlaps a first region of the ground electrode; and
    a second power receiving electrode coupled to a second end of the load circuit and having a second surface that faces the ground electrode and overlaps a second region of the ground electrode,
    wherein at least one of the first surface and the second surface has a surface area greater than a corresponding surface area of the first region and the second region of the ground electrode, respectively.

9. The power receiving apparatus according to claim 8, wherein, when the power receiving apparatus is positioned adjacent the power transmitting apparatus, the first power receiving is coupled through the electric field to a first power transmitting electrode of the power transmitting apparatus and the second power receiving electrode is coupled through the electric field to a second power transmitting electrode of the power transmitting apparatus.

10. The power receiving apparatus according to claim 8, wherein the first power receiving electrode is an active electrode and the second power receiving electrode is a passive electrode.

11. The power receiving apparatus according to claim 8, wherein the ground electrode comprises at least one opening such that the corresponding surface area of the first region or the second region is less than the surface area of the first surface or second surface, respectively.

12. The power receiving apparatus according to claim 8, wherein the first surface of the first power receiving electrode comprises a square-shaped surface and the second surface of the second power receiving electrode comprises a U-shaped surface.

13. The power receiving apparatus according to claim 8, wherein the first power receiving electrode and the second power receiving electrode are disposed in a same plane of the power receiving apparatus, and wherein the first surface and the second surface face the same direction.

14. A non-contact power transmission system comprising:
a power transmitting apparatus including:
a ground electrode,
an AC power supply circuit,
a first power transmitting electrode coupled to a first end of the AC power supply circuit and having a first surface that faces the ground electrode and overlaps a first region of the ground electrode, and
a second power transmitting electrode coupled to a second end of the AC power supply circuit and having a second surface that faces the ground electrode and overlaps a second region of the ground electrode,
wherein at least one of the first surface and the second surface has a surface area greater than a corresponding surface area of the first region and the second region of the ground electrode, respectively; and
a power receiving apparatus including:
a first power receiving electrode coupled to a first end of a load circuit and that is coupled through an electric field to the first power transmitting electrode when the power receiving apparatus is positioned adjacent the power transmitting apparatus, and
a second power receiving electrode coupled to a second end of the load circuit and that is coupled through an electric field to the second power transmitting electrode when the power receiving apparatus is positioned adjacent the power transmitting apparatus.

15. The non-contact power transmission system according to claim 14, the ground electrode comprises at least one opening such that the corresponding surface area of the first region or the second region is less than the surface area of the first surface or second surface, respectively.

16. The non-contact power transmission system according to claim 15, wherein a maximum size of an inner length of the at least one opening is less than or equal to 1/N of a wave length of a sine wave defining an AC voltage supplied by the AC power supply circuit, wherein N is an even number greater than or equal to two.

17. The non-contact power transmission system according to claim 14, wherein the first surface of the first power transmitting electrode comprises a square-shaped surface and the second surface of the second power transmitting electrode comprises a U-shaped surface.

18. A non-contact power transmission system comprising:
a power transmitting apparatus including:
an AC power supply circuit,
a first power transmitting electrode coupled to a first end of the AC power supply circuit, and
a second power transmitting electrode coupled to a second end of the AC power supply circuit; and
a power receiving apparatus including:
a ground electrode;
a first power receiving electrode coupled to a first end of a load circuit and that is coupled through an electric field to the first power transmitting electrode, the first power receiving having a first surface that faces the ground electrode and overlaps a first region of the ground electrode; and
a second power receiving electrode coupled to a second end of the load circuit and that is coupled through an electric field to the second power transmitting electrode, the second power receiving electrode having a second surface that faces the ground electrode and overlaps a second region of the ground electrode,
wherein at least one of the first surface and the second surface has a surface area greater than a corresponding surface area of the first region and the second region of the ground electrode, respectively.

19. The non-contact power transmission system according to claim 18, wherein the ground electrode comprises at least one opening such that the corresponding surface area of the first region or the second region is less than the surface area of the first surface or second surface, respectively.

20. The non-contact power transmission system according to claim 18, wherein the first surface of the first power receiving electrode comprises a square-shaped surface and the second surface of the second power receiving electrode comprises a U-shaped surface.

* * * * *